Figure 1:
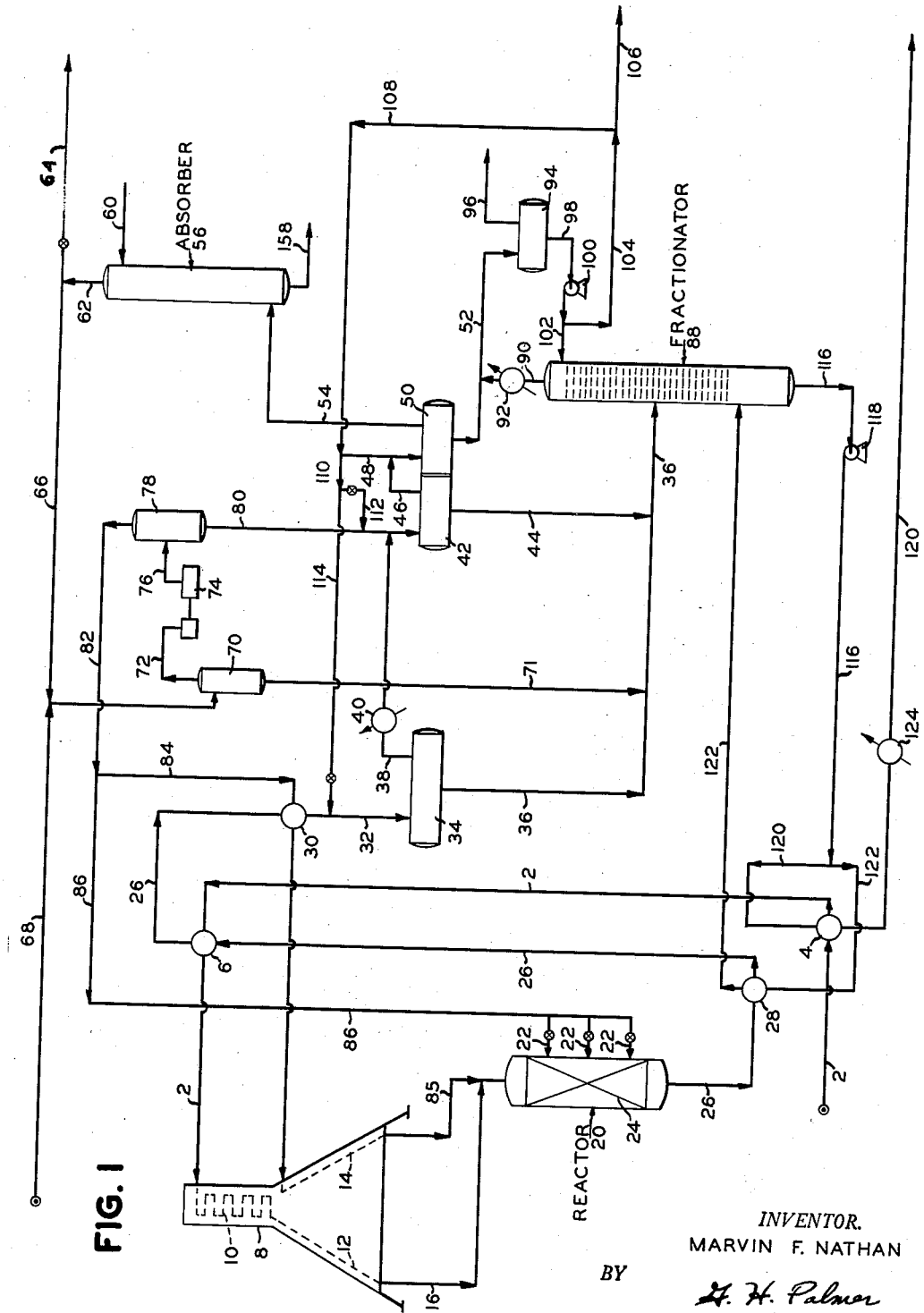

United States Patent Office 2,840,513
Patented June 24, 1958

2,840,513

PROCESS FOR SEPARATING RECYCLE HYDROGEN FROM ENTRAINED CONDENSED GASES IN HYDRODESULFURIZATION PROCESS

Marvin F. Nathan, New York, N. Y., assignor to The M. W. Kellogg Company, Jersey City, N. J., a corporation of Delaware Application January 4, 1956, Serial No. 557,269

6 Claims. (Cl. 196—24)

This invention relates to a process for the separation of a non-condensible gas from a liquid-vapor hydrocarbon mixture, more particularly it relates to a process for separating hydrogen from a mixture of liquid and vapor hydrocarbons and hydrogen. Still more particularly, it relates to a method for separating hydrogen from a mixture of liquid and vapor hydrocarbons and hydrogen released as product from a catalytic reaction zone, to provide a hydrogen-rich gas for recycle to said catalytic reaction zone.

In the catalytic treatment of hydrocarbon fractions such as, for example in the desulfurization of hydrocarbons in the presence of hydrogen, it is customary to obtain as a result of the treatment a hydrocarbon fraction contaminated with one or more non-condensible gases. It is desirable in almost every case to separate these gases from the reaction zone effluent. In the case of the hydrogen gas, separation is desirable for the purpose of providing a stream of this material for recycle to the reaction zone. In the case of hydrogen sulfide or other non-condensible gases formed in the desulfurization reaction, separation is desirable in order to prevent equipment corrosion, contamination of the product, etc. In the past the general procedure has been to cool the entire reaction zone effluent to a sufficiently low temperature to condense the major portion of the hydrocarbons, separate the liquid and vapor, further treat the vapor for the removal of hydrogen sulfide, recycle the hydrogen to the reaction zone and process the liquid, more usually by conventional fractionation, to provide a suitable desulfurized product. This method, while workable, suffers from two deficiencies, in that: (1) it allows very little control over the concentration of hydrogen in the hydrogen recycle gas and (2) it is very inefficient from a thermal standpoint since the liquid portion of the reaction zone effluent must be reheated in order to accomplish the desired fractionation.

It is an object of the invention to provide an improved process for separating a non-condensible gas from a liquid-vapor hydrocarbon mixture.

Another object of this invention is to provide an improved method for separating hydrogen and hydrogen sulfide from a heated liquid-vapor hydrocarbon mixture.

Still another object of this invention is to provide an improved process for enriching the hydrogen recycle gas in the catalytic desulfurization of hydrocarbons.

Yet another object of this invention is to increase liquid yield in the catalytic desulfurization of hydrocarbons.

These and other objects of the invention will become more apparent from the following detailed description and discussion.

The preceding objects are realized broadly in the method of this invention by passing the vapor portion of a heated vapor-liquid hydrocarbon mixture containing a non-condensible gas through a series of at least 2 zones with cooling between at least the first and second zones. Liquid is removed from each of the zones and subjected to further processing either as a combined stream or as separate streams. A gas containing the non-condensible material and also uncondensed light hydrocarbons is removed from the zone of lowest temperature, which is the last zone. In a more specific aspect of the invention, the hydrocarbon mixture is the effluent from a desulfurization zone and the non-condensible gas comprises primarily hydrogen and hydrogen sulfide.

In another aspect of the invention, the liquid from each of the series of zones is combined and introduced into a fractionating zone where it is separated into two or more fractions. After cooling, one or more of the liquid fractions are returned to one or more of the zones of the series for the purpose of absorbing light hydrocarbons from the gaseous phase in said zones, thereby increasing the concentration of the non-condensible gases in the vapor phases. In a more specific aspect, condensed overhead liquid from the fractionating zone is returned for this purpose to the last zone of the series.

In still another aspect of the invention, the liquid-vapor hydrocarbon mixture containing a non-condensible gas is present under super atmospheric pressure. Liquid from the fractionating zone which is maintained at a pressure substantially lower than the pressure on the hydrocarbon mixture is pumped to a zone maintained at a pressure intermediate between the fractionating zone and the pressure on the liquid-vapor hydrocarbon mixture and from there is introduced into the last of the series of zones employed for the separation of the non-condensible gas. Liquid from this last zone is returned to the zone of intermediate pressure thereby providing a circulating hydrocarbon absorbent stream.

For the purposes of this invention, the term "non-condensable gases" is intended to include any material either hydrocarbon or non-hydrocarbon in nature which is not a liquid under the conditions and within the ranges of temperature and pressure disclosed herein.

The invention described herein finds application generally in hydrocarbon processes wherein a non-condensable gas is present in substantial quantities. In particular, it is applicable in process for the treatment of hydrocarbons in the presence of hydogen, such as for example, in desulfurization, reforming, isomerization, dehydrogenation, hydrogenation, hydrocracking, etc. For purposes of illustrating the application of the invention, the subsequent discussion is directed primarily to its use in a process for the catalytic desulfurization of hydrocarbons in the presence of hydrogen. This, however, is not intended in any way to limit the scope of the invention.

The desulfurization treatment of hydrocarbons is usually conducted at a temperature of at least about 600° F. and can be as high as the point where cracking effects become undesirably excessive. The desulfurization temperature is usually about 650° F. to about 900° F. At temperatures greater than about 900° F., there is a substantial increase in the production of normally gaseous products, e. g., hydrocarbons having 1–3 carbons atoms, consequently, it is desirable to operate below this temperature in order to avoid excessive loss of hydrocarbon material through gas formation, etc. Desulfurization may be carried out under a wide range of pressures, varying between about 25 and about 5000 p. s. i. g. However, preferably the pressure is maintained within a range of between about 300 and about 1000 p. s. i. g.

The catalyst employed for desulfurization includes the oxides and/or sulfides of a metal of group VI of the periodic table, either alone or supported on a suitable carrier material, such as for example, alumina, silica-alumina, magnesia, fuller's earth, kieselguhr, pumice, bentonite clay, etc. The catalytic material can be used if desired in combination with an oxide and/or sulfide of a group VIII metal having an atomic number not greater than 28. The catalytic agent can comprise from about 0.1 to about 25 percent by weight of the total catalyst, preferably about 6 to 15 percent by weight thereof. The catalytic agent can be, for example, molybdenum trioxide, molybdenum trisulfide, chromia, tungsten sulfide, etc. The promoter includes, for example, cobalt oxide and/or sulfide, iron oxide and/or sulfide, and nickel oxide and/or sulfide. When employed, the promoter comprises about 1 to 10 percent, preferably about 1 to 5 percent, based on the total weight of catalyst. In order to enhance the stability of the catalyst at elevated temperatures, silica can be used in an amount of about 0.5 to about 12 percent by weight, based on the total catalyst.

In the operation of the desulfurization process, the conditions can be varied so as to obtain either a net consumption of hydrogen or a net production of hydrogen. Hydrogen production or consumption is determined by a proper selection of operating conditions, hence, the description of the conditions hereinafter given will apply for both types of operations depending upon a suitable choice thereof. Normally, more effective removal of sulfur occurs under conditions of net consumption of hydrogen, because less feed material is used in furnishing the hydrogen which is involved in the operation producing hydrogen. Furthermore, an operation involving a net consumption of hydrogen results in higher yields of desulfurized product and greater sulfur removal under comparable operating conditions. The hydrogen rate for this process varies in the range of between about 200 and about 10,000 standard cubic feet (measured at 60° F. and 760 mm. mercury) per barrel of oil feed (a barrel of oil feed being 42 gallons). More usually the hydrogen rate is in the order of about 500 to about 5000 standard cubic feet per barrel.

The hydrocarbon oils which may be desulfurized include any hydrocarbon oil containing sulfur, such as for example, naphtha, kerosene, gas oil, reduced crudes, crude oil, etc. The hydrocarbon oils to be treated may be derived from petroleum crudes having an initial boiling point between about 110 to 750° F., and having an end point between about 350 to 1350° F. These hydrocarbon oils may be straight run or virgin stocks, materials which have been previously cracked thermally or catalytically or mixtures of straight run or cracked stocks. The sulfur content of the hydrocarbon oil will generally be about 3.0 to about 6.0 weight percent.

The severity of the desulfurization process is measured in terms of a severity factor, which is obtained by dividing the catalyst to oil ratio by the weight space velocity. The catalyst oil ratio is determined on the weight basis, which in the case of a moving bed system, it measures the relative rates of catalyst and oil being charged to the reaction zone, based on inlet conditions. In the case of a fixed bed system, a superficial catalyst to oil ratio is determined as the reciprocal of the product between the reaction period and the weight space velocity. Ordinarily, the catalyst to oil ratio is understood to describe a condition pertaining to a moving bed system, however, for the purpose of this specification, the catalyst to oil ratio as defined above will be employed in determining this condition for a fixed bed system. The weight space velocity in the severity factor is determined on a weight basis, and it is measured as the pounds of oil charged to the reaction zone at an hourly basis per pound of catalyst which is present therein. Generally, the catalyst to oil ratio for both fixed and moving bed systems will be in the range of about 0.004 to about 3; whereas preferably in a fixed bed system, the catalyst to oil ratio is about 0.004 to about 0.2, and in a moving bed system, it is preferably about 0.05 to about 3. In general, the weight space velocity for both moving and fixed bed systems is in the range of about 0.25 to about 10, preferably about 0.5 to about 5. These two conditions, viz., the catalyst to oil ratio and the weight space velocity are employed to determine the severity of the desulfurization operation. Generally, the severity factor is in the range of about 0.001 to about 0.3.

The desulfurization process can be practiced as either a fixed or moving bed system involving either the nonfluid or fluid bed technique. For a fluid system, generally, the catalytic material is in a finely divided form having a particle size not greater than 250 microns, or more usually, in the range of about 10 to about 100 microns. The catalytic material in this finely divided state is fluidized by the upward passage of materials therethrough. The passage of gaseous materials through the mass of finely divided material is measured in terms of the superficial linear gas velocity which is generally in the range of about 0.1 to about 50 feet per second, more usually, about 0.1 to about 6 feet per second. In commercial practice, it is preferred to employ a superficial linear gas velocity of about 1 to about 2½ feet per second, because a dense fluidized phase is produced, providing excellent contact between the solid particles and the fluidizing medium. In a fixed bed system employing the fluidized technique at least two vessels are employed in order that there can be a continuous flow of processing materials in the operation. Generally, the reaction period of each vessel is about 1 to about 400 hours, preferably about 20 to about 100 hours; whereas the regeneration cycle is about 0.5 to about 10 hours, preferably about 0.5 to about 4 hours. In a fluidized moving bed system, separate zones are employed for the reaction and the regeneration of the catalyst. The catalyst is circulated in a temporarily deactivated form to the regeneration zone wherein the carbonaceous material is removed by combustion with an oxygen containing gas before being circulated back to the reaction zone. The fluidized mass of catalytic material in any of the processing zones can be either a dense or lean phase depending upon the superficial linear gas velocities employed. The linear gas velocities specified hereinabove apply to all of the processing zones.

When it is preferred to practice the invention in a non-fluid system, the vessel arrangements, operating conditions, etc., are substantially the same as provided in the aforedescribed fluid operations. The catalyst instead of being finely subdivided however is present either in the shape of irregular fragments or pieces or as molded or pelleted shapes or relatively large cross-section. If a moving bed system is used, it is necessary to provide mechanical means for transferring the catalyst from one zone to another.

As a result of contacting the catalytic material with the hydrocarbon oils under desulfurization conditions, carbonaceous material is produced which deposits on the catalyst thereby reducing its activity. In order to restore the activity of the catalyst, it is subjected to a regeneration treatment which involves burning the carbonaceous material with an oxygen containing gas, e. g., air; oxygen; diluted air, containing about 1 to about 10 percent by volume of oxygen; etc. The temperature of regeneration is about 600° F. to about 1200° F., preferably about 950° F. to about 1150° F. The pressure of regeneration can be at the same level which was mentioned hereinabove with respect to the reaction zone, or it can be operated at a higher or lower level in the range specified. Usually, the regenerated catalyst will contain carbonaceous material in an amount of about 0 to about 1 percent by weight.

In a typical application of the invention, a gas oil is desulfurized at a temperature in the order of about 650° F. to about 850° F., a total pressure in the range of about 300 to about 1000 p. s. i. g., a weight space velocity of about 0.1 to about 10, a catalyst to oil ratio of about 0.1 to about 10 and a hydrogen rate of about 500 to about 5000 standard cubic feet (measured at 60° F. and 760 mm.) per barrel of oil feed (1 barrel equals 42 gallons). During the desulfurization reaction, sulfur contained in the gas oil is converted to hydrogen sulfide and additional reactions take place which convert a portion of the gas oil to lower boiling compounds. Inasmuch as the desulfurization reaction is carried out in the presence of an excess of hydrogen, the reaction zone effluent also contains a substantial quantity of this material. It is desirable in order to provide a usable desulfurized gas oil that the non-hydrocarbon gases and the hydrocarbons boiling below gas oil be separated from the reaction product.

As an economy means, before commencing the separation process, the effluent from the desulfurization reactor is passed through a series of heat exchange steps wherein fresh gas oil feed and hydrogen recycle gas are preheated and the temperature of the effluent is reduced, more usually to between about 750 and about 300° F. The effluent, now existing as a mixture of liquid and vapor hydrocarbons containing hydrogen and hydrogen sulfide, is passed into an accumulator wherein the two phases divide and from which vapor and liquid are withdrawn as separate streams. Since at least a part of the hydrogen present in the vapor fraction is recycled to the desulfurization reaction zone, it is desirable to maintain the pressure on this material as high as possible so as to minimize compression costs. In view of this, the operation is usually conducted in such a manner as to minimize the drop in pressure both in the reactor and the accumulator. Vapor from the accumulator comprising a mixture of hydrogen, hydrogen sulfide and light hydrocarbons is passed through a condenser wherein the temperature is reduced to between about 150 and about 80° F. As a result, an additional quantity of the gaseous hydrocarbons are condensed. The mixture is then passed into a second accumulator from which vapor and liquid are again separately withdrawn. This procedure is repeated, if necessary, in succeeding condensers and accumulators until the desired composition of the final gas phase is obtained. More usually, the final gas composition is set by the temperature which is obtainable from the use of ordinary cooling water, namely between about 150 and about 80° F., and the pressure on the system, which as previously stated is preferably maintained at a maximum. The gas from the last accumulator in the series is passed through a separation step for the removal of hydrogen sulfide and, after compression to a suitable pressure and preheating, is recycled to the desulfurization reaction zone.

Liquid streams from the various accumulators are treated, more usually in one or more fractionating zones, to obtain the desired separation of the various hydrocarbon constituents. If desired, the condensed liquid from each accumulator may be treated separately or one or more of the fractions may be combined before treating. When combined, the total accumulator liquid has a temperature of between about 740 and about 290° F. This material is passed to a fractionating tower wherein it is separated into a gas oil fraction which is removed from the lower portion of the tower and a light hydrocarbon fraction which is removed from the top of the tower. The gas oil forms the principal product of the process. The light hydrocarbon product consists of a mixture of various low boiling hydrocarbons which were formed in the desulfurization reactor. This material may be yielded from the unit as is or it may be further processed to recover various fractions or individual hydrocarbon compounds.

The application of the invention just described has a number of advantages over the conventional method of desulfurizing hydrocarbons. In the conventional desulfurization process, the reaction zone effluent after preliminary heat transfer to supply heat to the gas oil feed and hydrogen recycle is passed through a conventional water condenser wherein the temperature is reduced to substantially the same level which exists in the final accumulator of the aforedescribed operation. Although this method of operation effects a separation of liquid and vapor, the liquid which results is at a temperature of between about 150 and about 80° F. which is substantially lower than the liquid temperature which results from the operation proposed herein. Obviously, in the conventional unit a large quantity of heat must be added to the liquid entering the fractionator before a suitable separation by fractionation can be effected. This heat must be supplied on a continuous basis and thus not only necessitates an initial outlay of money for additional heating equipment but also increases day to day operating costs.

Therefore, one of the principal advantages of this method of operation over the conventional desulfurization of hydrocarbons is that it eliminates the requirement for heating the fractionator feed. Since this stream in the conventional unit would contain large quantities of hydrogen sulfide the necessity of a high cost alloy exchanger is eliminated.

The temperature of the combined liquid introduced to the fractionator is sufficiently high that the requirement for a reboiler in the bottom of this tower is also eliminated. Thus the heat normally used to reboil the fractionator can, in this improved method of operation, be used to preheat the fresh gas oil feed to the reactor. Furthermore, the bottoms product of the fractionator which in the conventional system is used to preheat the fractionator feed can also be used for the purpose of preheating the fresh gas oil feed to the reactor. It is apparent, therefore, that the improved method of operation disclosed herein has the advantage of reducing duty of the gas oil furnace with a corresponding reduction in the amount of utilities required. A further advantage in the use of the improved method of operation lies in the provision of heat at various points in the process at higher levels than in the conventional system thus providing a more efficient utilization of thermal energy.

In another aspect of the invention, it has been found possible to effect a substantial change in the concentration of the hydrogen recycle stream by introducing an absorbent hydrocarbon material into one or more of the series of accumulators through which the desulfurization effluent is passed. In this operation, the vapor-liquid equilibrium in the accumulators so treated is shifted so that a portion of the hydrocarbon components in the vapor phase pass into the liquid phase. More usually, it is desirable to introduce the absorbent hydrocarbon material into the accumulator at or below the temperature normally maintained therein so as to take maximum advantage of inter-accumulator cooling. The absorbent hydrocarbon material may be any hydrocarbon fraction which contains primarily hydrocarbons having a lower vapor pressure than the light hydrocarbons present in the accumulator vapor and contains a smaller quantity of said light hydrocarbons than is present in the accumulator liquid. When the absorbent liquid is introduced into the last of the series of accumulators, it is preferred to use for this purpose material from the overhead of the fractionating zone. The use of even a small quantity of the absorbent hydrocarbon material has the effect of favorably shifting the vapor-liquid equilibrium in the accumulator, however, ordinarily it is desirable to provide sufficient absorbent material to effect the removal of a substantial portion of the light hydrocarbon components from the accumulator vapor. More usually, the amount of absorbent material introduced is between about 1000 and about 10,000 pounds per mol of condensed liquid in the vapor-liquid hydrocarbon mixture entering the accumulator.

In the preferred application of this aspect of the invention, light hydrocarbon material obtained from the separation of the combined accumulator liquids in the previously described gas oil desulfurization operation is used as the absorbent material. This material which is removed from the top of the fractionating zone is cooled to between about 110 and about 80° F., and is passed to an accumulator. Non-condensed hydrocarbons are vented and a part of the condensed liquid is returned to the fractionator as reflux. The remainder is divided into two streams, one of which is yielded from the unit and the other is passed to the last accumulator in the series wherein it acts as an absorbent to remove a portion of the light hydrocarbons from the vapor phase. In order to minimize heat loss and condenser surface, the liquid in the last accumulator is preferably passed to the fractionating tower accumulator, thus providing in effect a circulating stream between these two vessels. However, if desired a part or all of this material may be combined with the liquid from the other accumulators in the series for introduction into the fractionating tower. The quantity of absorbent hydrocarbon used in this specific type of operation varies over a wide range, however, more usually between about 1000 and about 10,000 pounds of absorbent are recycled for each mol of condensed liquid entering the accumulator in the desulfurized vapor-liquid mixture.

The fractionation operation whereby the liquid portion of the desulfurization zone effluent is separated into a gas oil fraction and a light hydrocarbon fraction is usually carried out at a low pressure since high pressures result in excessively high temperatures in the bottom of the tower. One difficulty encountered in the low pressure operation relates to the problem of condensing lighter components in the fractionator overhead. Inasmuch as the temperature to which the overhead material can be lowered is limited by the cooling water temperature it usually becomes necessary to vent a portion of this material as vapor. When operating to increase hydrogen concentration in the hydrogen recycle gas by recycling contaminated fractionator overhead to the accumulators in series, this problem is aggravated and the vapors vented from the fractionator accumulator are substantially increased in quantity. In many cases, it may not be economical to further process these vapors for the recovery of valuable light hydrocarbons. Even when considerations of economics dictate further treatment of this vapor stream, it is necessary to add additional equipment therefor and the operating costs of desulfurization are thereby increased.

In still another aspect of this invention, a method is provided whereby light components removed from the vapor in the last accumulator of the series are retained in the liquid state and are passed from the unit in the liquid product yield. This is accomplished by the use of an accumulator maintained at a pressure intermediate between the fractionator accumulator and the last accumulator of the series through which the desulfurized vapor-liquid hydrocarbon mixture is passed. In carrying out this aspect of the invention, liquid from the fractionator accumulator is transferred to the accumulator of intermediate pressure and the recycle material to the last of the series of accumulators is provided from this vessel. In addition, enriched liquid from the last of the series of accumulators is returned to the accumulator of intermediate pressure. Net liquid yield from the overhead of the fractionator is removed from the accumulator of intermediate pressure and passed from the unit. The pressure in this intermediate accumulator may be maintained at any level between the pressure in the last of the series of accumulators and the fractionator overhead accumulator. The pressure used in any particular operation will depend both on the pressures in the two latter vessels and the use for which the liquid yield from the former vessel is intended. When operating in the pressure ranges previously given for desulfurization, more usually the intermediate accumulator is maintained at a pressure between about 150 and about 25 p. s. i. g.

Although the previous discussion has been directed to the application of the invention in its various aspects to the process of desulfurization, in its broadest aspect the invention is generally applicable to any process wherein it is desirable to separate a non-condensible gas from a liquid-vapor hydrocarbon mixture. More specifically, it may be used in catalytic reforming, dehydrogenation, hydrogenation, isomerization, hydrocracking, and other petroleum processes which are carried out in the presence of hydrogen. These processes, including the feed materials, catalysts, temperatures, pressures and other operating conditions used therein, are well known in the art and therefore, are not described in detail here. The same considerations which are important with reference to the application of this invention in a process for the desulfurization of hydrocarbons, namely that the liquid-vapor hydrocarbon mixture containing a non-condensible gas is initially at an elevated temperature, that said mixture is passed through a series of at least two accumulators, that cooling is provided between at least the first and second accumulators, etc., all apply in the application of this invention to other processes. In other aspects of the invention, variations are permissible from the specific conditions which are present in its application in the desulfurization of hydrocarbons. For example, although desulfurization is carried out at an elevated pressure, it is not necessary for the purposes of this invention that the liquid-vapor hydrocarbon mixture containing a non-condensible gas be under superatmospheric pressure. The invention is successfully carried out under any pressure below, at or above atmospheric. Again, in the application of the invention to the desulfurization of hydrocarbons, it is desirable in order to facilitate the separation of hydrogen sulfide formed in the process from hydrogen recycle to the reaction zone that the effluent from the reaction zone be processed in such a manner as to maintain the pressure at a maximum. In other applications of the invention, however, this may not be preferable or even desirable, therefore, operation of the successive accumulators in the series may be carried out at substantially different pressures. Again, although the desulfurization process is operated at a high temperature, it is not contemplated that this be a limiting factor in the invention but that its application should extend to substantially lower temperatures. In the preferred embodiment of the invention described, the absorbent material was stated to be preferably a part of the original liquid-vapor hydrocarbon mixture; however, other suitable hydrocarbon mixtures having the requisite absorbent properties may be used in this feature of the invention.

Figure 2:
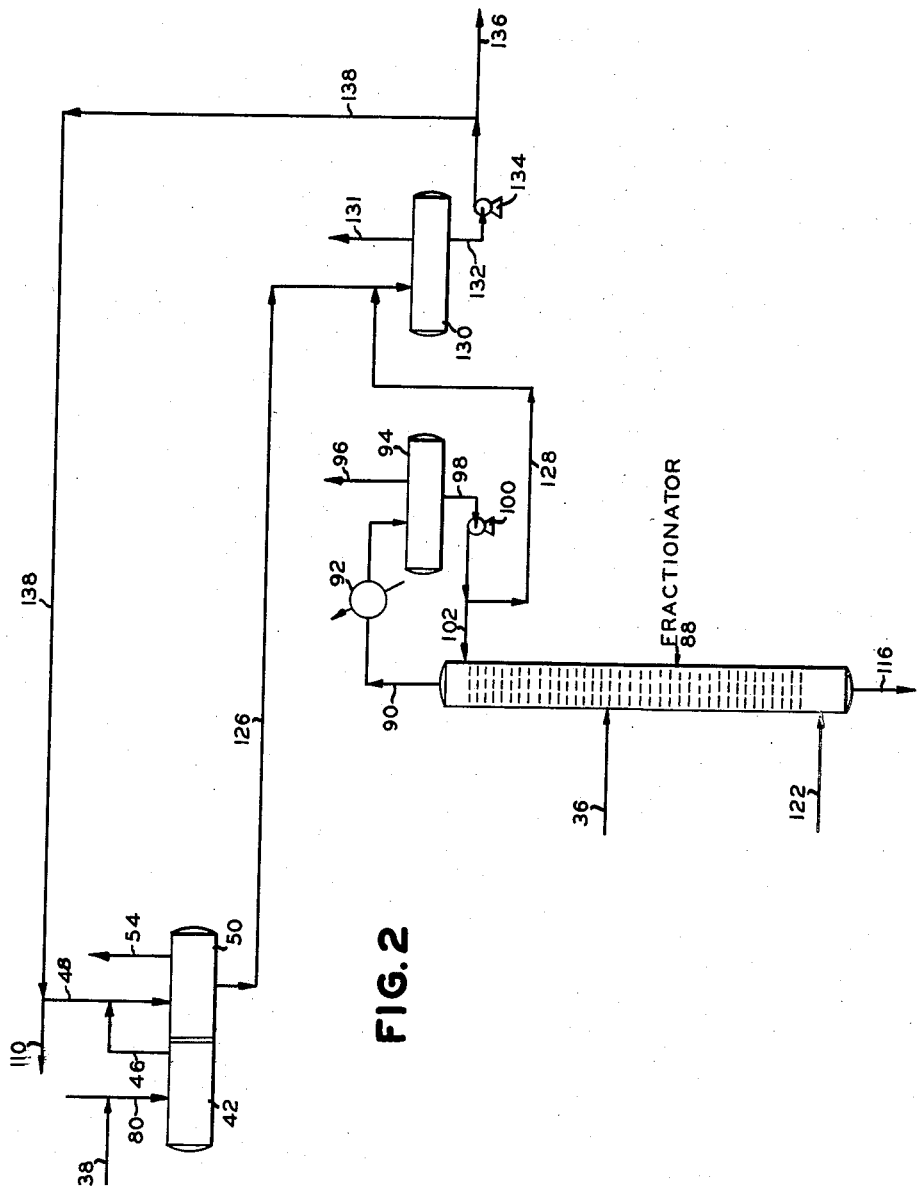

In order to more clearly describe the invention and to provide a better understanding thereof, reference is had to the accompanying drawings of which:

Figure 1 is a schematic diagram of a desulfurization unit incorporating the treatment of the reaction zone effluent in the manner heretoforedescribed, and Figure 2 is a schematic diagram of a process which embodies that aspect of the invention relating to the provision of an accumulator of intermediate pressure following the fractionator overhead accumulator.

Referring to Figure 1, a gas oil having an API gravity of about 30 is introduced to a desulfurization unit through conduit 2, passed through heat exchanger 4 where it is increased in temperature by contact with hot desulfurized gas oil, passed through heat exchanger 6 where it is further increased in temperature by hot effluent from the desulfurization reactor and is introduced into a furnace type heater 8. Within the heater the gas oil passes through a convection section 10 followed by a radiant section 12, leaves the heater through conduit 16 and enters a desulfurization reactor 20. Shortly before its entry into the reactor the gas oil is joined by a heated hydrogen recycle gas from conduit 85. The reactor 20 is a vertical cylindrical vessel containing a bed 24 of granular catalyst consisting of the oxides of cobalt, molybdenum and aluminum in a weight percent of about 3.0, 9.0 and 88.0, respectively. Within the reactor the gas oil and hydrogen mixture is contacted with the catalyst at a temperature of about 700° F. and a pressure of about 500 p. s. i. g., as a result of which sulfur and sulfur compounds in the gas oil react with hydrogen to form hydrogen sulfide. Additional reactions also take place whereby a portion of the gas oil is converted to lower boiling hydrocarbon compounds. The reactions which take place in the desulfurization reactor are exothermic and cooling is required to maintain an isothermal operation. For this purpose a portion of unheated hydrogen recycle gas is introduced into the reactor at spaced points through conduits 22. Effluent from the reactor passes from conduit 26 through exchanger 28 where heat is transferred to reboil the bottom of fractionator 88. This stream is then passed through exchanger 6 for the purpose of preheating the gas oil feed as previously noted and finally through exchanger 30 wherein heat is transferred to hydrogen recycle gas. Leaving exchanger 30, the desulfurization effluent comprises a mixture of vapor and liquid hydrocarbons and non-condensible gases, principally hydrogen and hydrogen sulfide. This material is introduced into an accumulator 34 wherein the liquid and vapor are allowed to separate. The temperature in the accumulator as a result of the previous heat exchange steps is substantially lower than the reactor outlet temperature, namely about 500° F. Vapor and liquid are separately withdrawn from the accumulator, the vapor passing through conduit 38 and water condenser 40 wherein the temperature is lowered to about 130° F., and the liquid being withdrawn through conduit 36 and admitted to fractionator 88. The stream leaving condenser 40, now a mixture of liquid and vapor, is admitted to a second accumulator 42 where again a separation of vapor and liquid takes place. The vapor in this accumulator is substantially richer in non-condensible gases than the vapor in accumulator 34. The two phases are again separately withdrawn, with the liquid being removed through conduit 44 and combined with the liquid from accumulator 34, and the vapor passing through conduit 46 into a third accumulator 50. Before entering the latter accumulator, the vapor is joined through conduits 48 and 108 by liquid from the fractionator overhead accumulator 94. This liquid, which is at a temperature of about 100° F., reduces the temperature of the vapor and also acts as an absorbent to remove light hydrocarbons from the vapor and further increases the concentration of non-condensible gases in this phase. A third separation of liquid and vapor takes place in accumulator 50 and vapor is withdrawn therefrom through conduit 54 and introduced into an absorber for the removal of hydrogen sulfide. This is accomplished by contacting the vapor with a liquid absorbent introduced to this vessel through conduit 60, and removed from the absorber through conduit 58. The vapor leaving the absorber through conduit 62 now comprises a major proportion of hydrogen and a minor proportion of light hydrocarbon compounds. This material is divided into two streams with one stream being passed from the unit through conduit 64 and the remainder being passed through conduit 66 for return to the desulfurization reactor. The latter stream, which is designated as recycle hydrogen, is first introduced into a knock-out drum 70 wherein entrained liquid is removed and is then passed through conduit 72 into a compressor 74 where the pressure is increased to a sufficient level to provide passage of the gas through heater 8 and into the reactor 20. Prior to entering the heater, the recycle gas passes through a second knock-out drum 78 and through heat exchanger 30 as previously described. Liquid accumulated in the knock-out drum is transferred to accumulator 42 through conduit 80.

As previously noted, the combined liquid from accumulators 34 and 42 is introduced to a fractionator 88 through conduit 36. In this tower a separation is effected whereby material boiling in the gas oil range is removed from the bottom of the tower and lighter hydrocarbons are removed overhead. The bottom liquid, which is desulfurized gas oil, leaves the fractionator through conduit 116 and pump 118 and is divided into two streams. One portion of this material, which constitutes the desulfurized gas oil yield, is passed through conduit 120, exchanger 4 and water cooler 124 and is removed from the unit. The remainder of the desulfurized gas oil is passed through conduit 122 and exchanger 128 and is returned to the fractionator to provide heat to the bottom portion thereof. The overhead from the fractionator passes through conduit 90 and condenser 92, is joined by liquid from accumulator 50 through conduit 52 and the combined stream is introduced into an accumulator 94. Any of the tower overhead which remains unvaporized in the accumulator is vented therefrom through conduit 96. Liquid passes from accumulator 94 through conduit 98 and pump 100 and a portion is returned to the fractionator through conduit 102 as reflux. Of the remainder, a minor part is passed through conduits 104 and 106 and yielded from the unit and the rest, which constitutes the recycle absorbent material, is introduced to accumulator 50 through conduits 108 and 48, as previously noted.

An alternate method of operation wherein the yield of liquid material from the unit is increased, is provided by the scheme shown in Figure 2. Referring to this figure, the overhead from fractionator 88 is again condensed and passed into accumulator 94. However, in this method of operation, the accumulator is divided into only two streams, with one portion being returned to the fractionator through conduit 102 as reflux and the other portion being introduced through conduit 123 into accumulator 130. The latter stream before entering accumulator 130 is joined through conduit 126 by liquid from accumulator 50. Absorbent material for use in accumulator 50 is obtained from accumulator 130, being removed therefrom through conduit 132, pump 134 and conduits 138 and 48. The net light hydrocarbon yield from the process is removed from the unit through conduit 136.

It is desirable in operating the fractionator 88 to maintain this vessel at a bottom temperature below 600° F. This has the effect usually of keeping the tower pressure low. In view of this, the pressure in accumulator 94 is about 5 p. s. i. g. The pressure in accumulator 50, however, is preferably maintained at a maximum, in this instance about 450 p. s. i. g. It is desirable also that the liquid in accumulator 50, which contains light hydrocarbons absorbed from the vapor phase, be maintained at as high a pressure as is practicable in order to minimize the loss of hydrocarbons through vaporization and thus produce the desired clean up of the recycle gas. This is accomplished herein by maintaining accumulator 130 at a pressure intermediate between the pressures in accumulators 50 and 94, namely about 75 p. s. i. g. In this manner, the vapors vented from accumulators 94 and 130 through conduits 96 and 131 constitute a substantially smaller quantity of material than the vapors vented from accumulator 94 in the method of operation illustrated by Figure 1 and furthermore, are more readily usable. For example, if $H_2S$ is to be removed, a compressor is not required before scrubbing the vapors, and of the vapors are to be burned in a furnace or boiler, they are more easily handled.

The following data is presented to illustrate an application of the several aspects of the invention on a commercial scale.

Example

| Flows: | #/hr. |
|---|---|
| Gas oil feed to reactor | 82,000 |
| Desulfurized gas oil | 75,000 |
| Gasoline | 38,000 |
| Vapors from accumulator 94 | 700 |
| Vapors from accumulator 130 | 1,000 |
| Liquid from accumulator 34 | 59,500 |
| Vapor from accumulator 34 | 32,500 |
| Liquid from accumulator 42 | 20,700 |
| Vapor from accumulator 42 | 11,800 |
| Vapor from accumulator 50 | 8,500 |
| Gasoline recycle to accumulator 50 | 109,000 |

| Temperature °: | °F. |
|---|---|
| Reactor | 780 |
| Accumulator 34 | 500 |
| Accumulator 42 | 140 |
| Accumulator 50 | 100 |
| Accumulator 94 | 100 |
| Combined liquid to fractionator | 400 |
| Fractionator: | |
| Top | 340 |
| Bottom | 485 |

| Pressures: | P. s. i. g. |
|---|---|
| Reactor | 610 |
| Accumulator 34 | 550 |
| Accumulator 42 | 540 |
| Accumulator 50 | 535 |
| Accumulator 94 | 9 |
| Accumulator 130 | 75 |
| Fractionator bottom | 15 |

Reactor:
Hydrogen to oil ratio _____ 2,500 M cu. ft./bbl.
Weight space velocity _____ 5 lb./hr./lb.

| Desulfurization catalyst: | Percent by weight |
|---|---|
| Cobalt oxide | 3.0 |
| Molybdenum trioxide | 9.0 |
| Alumina | 88.0 |

Having thus described the invention by reference to a specific example thereof, it is understood that no undue limitations or restrictions are to be imposed by reason thereof, but that the scope of the invention is defined by the appended claims.

I claim:

1. In a process for the treatment of a liquid-vapor hydrocarbon mixture containing a non-condensable gas in which the non-condensable gas is separated from the hydrocarbon mixture at a low temperature, said mixture being initially at an elevated temperature and in which the mixture is further treated in a fractionating zone for the purpose of separating it into at least two fractions, the improvement which comprises introducing the liquid-vapor hydrocarbon mixture containing a non-condensable gas to the first of a series of at least two zones, removing vapor from each of the zones and passing it to the succeeding zone in the series, introducing a liquid absorbent material obtained in a manner hereinafter described into at least one of the series of zones, providing sufficient cooling before at least the zones free of absorbent to condense a part of the vapor, removing the liquid from each zone of the series, passing the liquid so removed to a fractionating zone wherein it is separated into an overhead vapor fraction and at least one heavier fraction, subjecting the overhead fraction to cooling whereby at least a portion of this material is condensed, introducing a portion of the condensed material which acts as an absorbent into at least one of the series of zones as previously described whereby the concentration of light hydrocarbons in the vapor phase of said zone is decreased and removing a vapor rich in non-condensable gas from the last in the series of zones.

2. In a process for the treatment of hydrocarbons in the presence of hydrogen in which the product of the treatment comprises a liquid-vapor hydrocarbon mixture containing hydrogen, in which the hydrogen is separated from the hydrocarbon mixture at a low temperature, said mixture being initially at an elevated temperature and in which the mixture is further treated in a fractionating zone for the purpose of separating it into at least two fractions, the improvement which comprises introducing the liquid-vapor hydrocarbon mixture containing hydrogen to the first of a series of at least two zones, removing vapor from each of the zones and passing it to the succeeding zone in the series, introducing a liquid absorbent material obtained in a manner hereinafter described into at least one of the series of zones, providing sufficient cooling before at least the zones free of absorbent to condense a part of the vapor, removing the liquid from each zone of the series, passing the liquid so removed to a fractionating zone wherein it is separated into an overhead vapor fraction and at least one heavier fraction, subjecting the overhead fraction to cooling whereby at least a portion of this material is condensed, introducing a portion of the condensed material which acts as an absorbent into at least one of the series of zones as previously described whereby the concentration of light hydrocarbons in the vapor phase of said zone is decreased and removing a vapor rich in hydrogen from the last in the series of zones.

3. In a process for the treatment of a liquid-vapor hydrocarbon mixture containing a non-condensable gas in which the non-condensable gas is separated from the hydrocarbon mixture at a low temperature, said mixture being initially at an elevated temperature and pressure, and in which the mixture is further treated in a fractionating zone for the purpose of separating it into at least two fractions, the improvement which comprises introducing the liquid-vapor hydrocarbon mixture containing a non-condensable gas to the first of a series of at least two zones, removing vapor from each of the zones and passing it to the succeeding zone in the series, introducing a liquid absorbent material obtained in a manner hereinafter described into at least one of the series of zones, providing sufficient cooling before at least the zones free of absorbent to condense a part of the vapor, removing the liquid from each zone of the series, passing the liquid from all but the last zone to a fractionating zone maintained at a pressure below the pressure in the last zone of the series wherein it is separated into an overhead vapor fraction and at least one heavier fraction, subjecting the overhead fraction to cooling whereby at least a portion of this material is condensed, introducing a portion of the condensed material to a zone not in the series which is maintained at a pressure intermediate between the pressure in the last zone of the series and the fractionating zone, passing condensed material which acts as an absorbent from the zone of intermediate pressure into at least one of the series of zones as previously described whereby the concentration of light hydrocarbons in the vapor phase of said zone is decreased, passing the liquid from the last of the series of zones to the zone of intermediate pressure and removing a vapor rich in non-condensable gas from the last in the series of zones.

4. In a process for the desulfurization of hydrocarbons in the presence of hydrogen in which the desulfurized product after preliminary heat exchange comprises a liquid-vapor hydrocarbon mixture containing hydrogen, in which the hydrogen is separated from the hydrocarbon mixture at a low temperature, said mixture being initially at an elevated temperature and pressure, and in which the mixture is further treated in a fractionating zone for the purpose of separating it into at least two fractions, the improvement which comprises introducing the liquid-vapor hydrocarbon mixture containing hydrogen to the first of a series of at least two zones, removing vapor from each of the zones and passing it to the succeeding zone in the series, introducing a liquid absorbent material obtained in a manner hereinafter described into at least one of the series of zones, providing sufficient cooling before at least the zones free of absorbent to condense a part of the vapor, removing the liquid from each zone of the series, passing the liquid from all but the last zone to a fractionating zone maintained at a pressure below the pressure in the last zone of the series wherein it is separated into an overhead vapor fraction and at least one heavier fraction, subjecting the overhead fraction to cooling whereby at least a portion of this material is condensed, introducing a portion of the condensed material to a zone not in the series which is maintained at a pressure intermediate between the pressure in the last zone of the series and the fractionating zone, passing condensed material which acts as an absorbent from the zone of the intermediate pressure into at least one of the series of zones as previously described whereby the concentration of light hydrocarbons in the vapor phase of said zone is decreased, passing the liquid from the last of the series of zones to the zone of intermediate pressure and removing a vapor rich in hydrogen from the last in the series of zones.

5. An improved method of separating a liquid-vapor hydrocarbon mixture containing a noncondensable gas which comprises passing the liquid-vapor hydrocarbon mixture containing a noncondensable gas at an elevated temperature and pressure to the first of a series of at least three separation zones, removing vapor from each of said zones and passing the vapor to the next succeeding zone, providing cooling between each separation zone to condense a part of the vapor passed thereto, combining the condensate recovered from the first and second separation zones and passing the same to a distillation zone, recovering a low-boiling condensate fraction and a high-boiling condensate fraction from said distillation zone, passing a portion of said low-boiling condensate to the last of the series of said separation zones in admixture with said vapors introduced thereto to absorb condensable material contained in said vapors and recovering a noncondensable vapor from the last of a series of said separation zones.

6. An improved method for separating a low-boiling-high-boiling hydrocarbon mixture containing a hydrogen-rich noncondensable gas to recover a hydrogen-rich gas substantially free of said hydrocarbons which comprises effecting a preliminary separation of said mixture containing noncondensable gases at an elevated temperature and pressure to recover a condensate fraction and a vapor fraction containing said noncondensable gases, passing said vaporous fraction sequentially through a series of separation zones at progressively reduced temperatures to separate and recover condensate in each of said zones, combining condensate recovered from said preliminary separation zone with condensate recovered from the first of said series of zones and passing the same to a distillation zone, separating a low-boiling hydrocarbon fraction from said distillation zone, passing a portion of said low-boiling hydrocarbon fraction as reflux to said distillation zone, passing another portion of said low-boiling fraction to the last of the series of said separation zones in admixture with said vapors introduced thereto to absorb entrained condensable material in said vapors and recovering a hydrogen-rich noncondensable gas from the last of said separation zones.

References Cited in the file of this patent

UNITED STATES PATENTS

| | | |
|---|---|---|
| 2,320,616 | Kniel et al. | June 1, 1943 |
| 2,377,736 | White | June 5, 1945 |

UNITED STATES PATENT OFFICE

CERTIFICATE OF CORRECTION

Patent No. 2,840,513                                         June 24, 1958

Marvin F. Nathan

It is hereby certified that error appears in the printed specification of the above numbered patent requiring correction and that the said Letters Patent should read as corrected below.

Column 2, line 44, for "process" read -- processes --; column 10, line 72, for "of the vapors" read -- if the vapors --.

Signed and sealed this 9th day of September 1958.

(SEAL)
Attest:

KARL H. AXLINE                                                    ROBERT C. WATSON

Attesting Officer                                                Commissioner of Patents